A. A. GORDON.
Loom-Picker.

No. 203,139. Patented April 30, 1878.

Witnesses.
W. J. Pratt.
E. C. Perkins.

Inventor.
Albert A Gordon
by Crosby & Gregory
Attys

UNITED STATES PATENT OFFICE.

ALBERT A. GORDON, OF WORCESTER, MASSACHUSETTS, ASSIGNOR TO GEORGE CROMPTON, OF SAME PLACE.

IMPROVEMENT IN LOOM-PICKERS.

Specification forming part of Letters Patent No. 203,139, dated April 30, 1878; application filed November 6, 1877.

*To all whom it may concern:*

Be it known that I, ALBERT A. GORDON, of Worcester, in the county of Worcester and State of Massachusetts, have invented an Improved Loom-Picker, of which the following is a specification:

This invention relates to pickers for looms, and specially to that class of pickers made of rawhide, and provided with an eye to receive and slide on a guide-rod; and consists in the method hereinafter described of manufacturing such pickers and retaining their eyes true when being dried.

I make my picker in the following manner, viz: I take the hides and soak them in water for several days. Then the hides are rubbed down on the beam. If they were salted, the salt is exuded, and the hide is dried with the scarfskin and hair on. In this operation a portion of the hair may be rubbed off; but the scarfskin or epidermis is always retained. This hide so prepared is then made into pickers in the ordinary way, the eye being formed over an iron spindle.

In the old plan the spindle is removed after the eye is formed, and as the picker dries the hole contracts and the picker frequently warps, so that the eye has to be reamed out before it can be fitted to the loom-spindle or guiding-rod to be used.

A yet greater evil is that, in drying, the layers forming the eye frequently separate and impair the strength of the picker.

These difficulties are obviated by placing in the eye of the picker a wooden core-piece, which is allowed to remain there until the latter is dry and ready to be applied to the spindle or rod of the loom. In this way the eye is retained in perfect shape and the material around it close and intact, the full thickness of the hide is retained, and the scarfskin is made to form the exterior of the picker.

The pickers may be of any usual shape.

Figure 1:
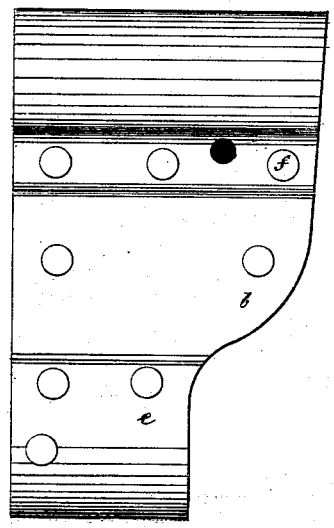
Figure 2:
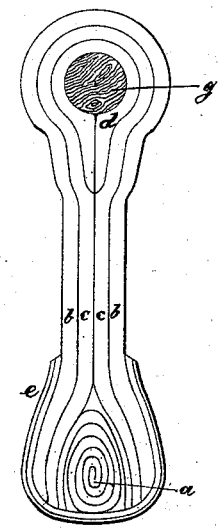

Figure 1 represents, in side elevation, a picker illustrating my invention, and Fig. 2 an edge view thereof.

The picker shown in the drawing is composed of a plug, $a$, of folded or rolled rawhide, and an eye-piece, $d$, inclosed between body-pieces $c\ c\ b\ b$, one or more, according to their thickness, the latter being held together by a wrapping-layer, $e$, and suitable rivets $f$. The scarfskin of the piece $b$ is preferably placed outermost.

The core-piece $g$, which is placed in the eye after it is formed, is preferably made of wood, because it is cheap, strong, and of but little weight. It will remain in the picker-eye, as shown in Fig. 2, until the picker is dry and is to be used, it preventing the eye shrinking or getting out of true.

It is obvious that any rawhide picker will be kept in shape at its eye by the plug or core.

I claim—

The herein-described method of manufacturing rawhide pickers and keeping their eyes true, consisting in forming the eyes over a core, and then placing into the eyes wooden plugs, which are permitted to remain therein while the pickers are dried, whereby the eyes are kept distended, substantially as described.

In testimony whereof I have signed my name to this specification in the presence of two subscribing witnesses.

ALBERT A. GORDON.

Witnesses:
J. B. SYME,
J. A. WARE.